United States Patent [19]

Golob

[11] Patent Number: 5,076,155
[45] Date of Patent: Dec. 31, 1991

[54] COOKWARE ORGANIZATION

[76] Inventor: Kenneth W. Golob, P.O. Box 802, Lewistown, Mont. 59457

[21] Appl. No.: 651,998

[22] Filed: Feb. 7, 1991

[51] Int. Cl.$^5$ .............................................. A47J 27/00
[52] U.S. Cl. ........................................ 99/446; 99/413; 99/450
[58] Field of Search ................... 99/339, 413, 425, 444, 99/446, 450

[56] References Cited

U.S. PATENT DOCUMENTS

| | | | |
|---|---|---|---|
| 1,642,071 | 9/1927 | Hosking | 99/446 |
| 1,650,634 | 11/1927 | Lutzler | 99/446 |
| 3,439,603 | 4/1969 | Reames | 99/413 |
| 4,332,188 | 6/1982 | Rhear | 99/446 |

FOREIGN PATENT DOCUMENTS 1869 of 1869 United Kingdom ................... 99/444
26107 of 1910 United Kingdom ................... 99/413

Primary Examiner—Philip R. Coe
Assistant Examiner—Mark Spisich
Attorney, Agent, or Firm—Leon Gilden

[57] ABSTRACT

A cookware organization arranged for accommodating and directing grease from various foods into an underlying container pot. The organization is optionally formed of ceramic to permit microwave-type cooking, and includes an underlying container pot, a conical pot insert mounted within the container pot, a griddle insert mounted within the conical insert, and a cover lid positioned within the conical insert in surrounding relationship relative to the griddle insert. The conical insert includes an exterior torroidal positioning ledge for lining the conical insert within the container pot, and wherein the conical insert further includes an interior ledge for positioning the lid and griddle insert thereon.

1 Claim, 5 Drawing Sheets

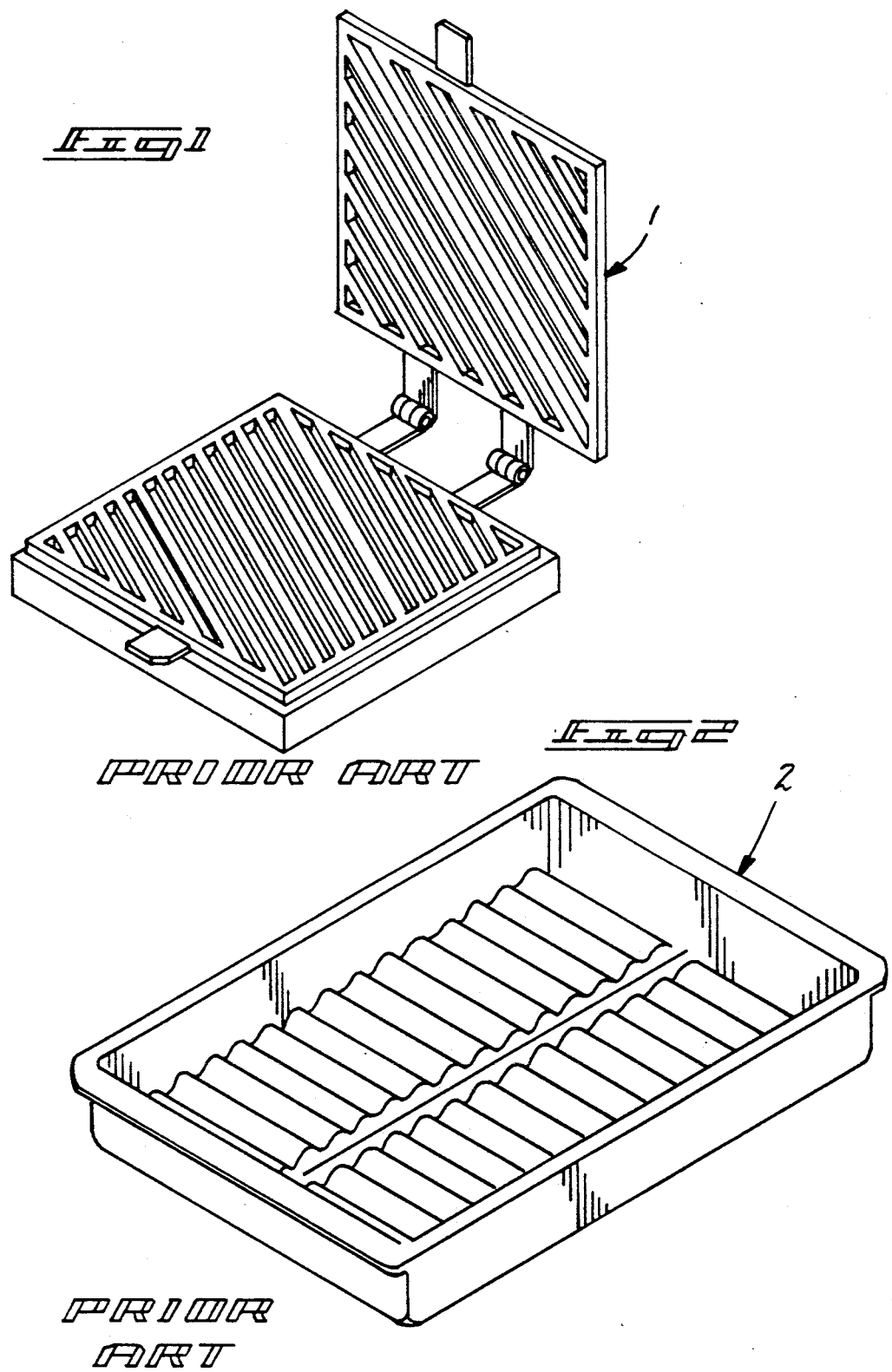

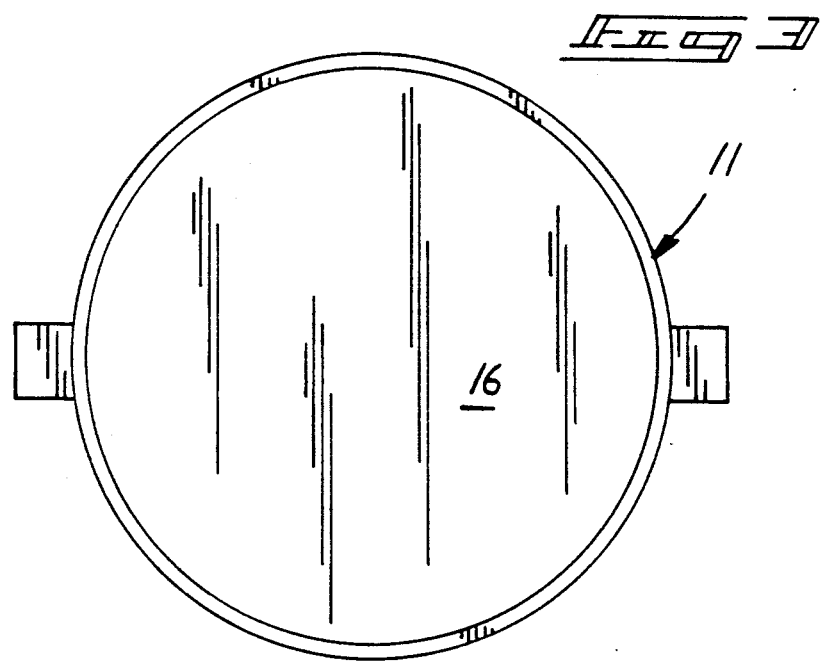
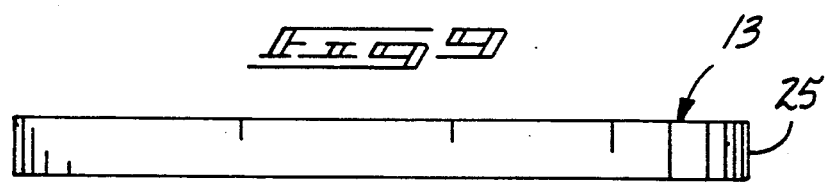
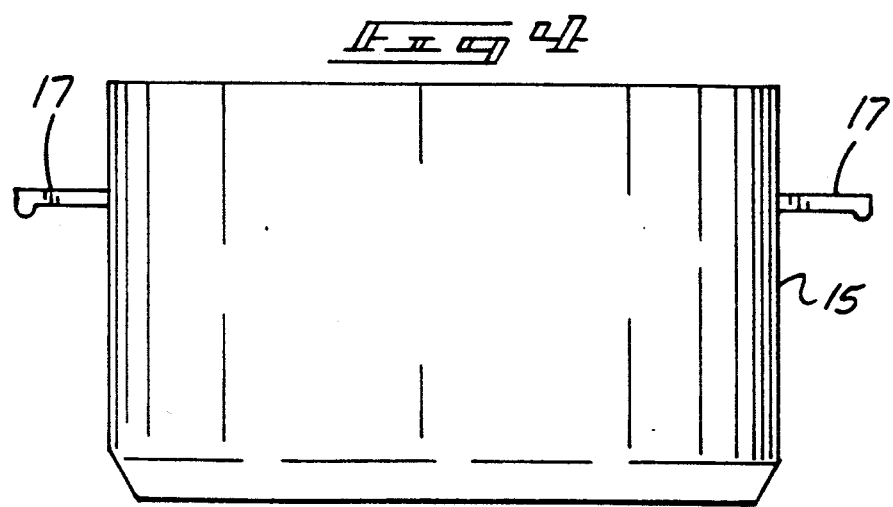

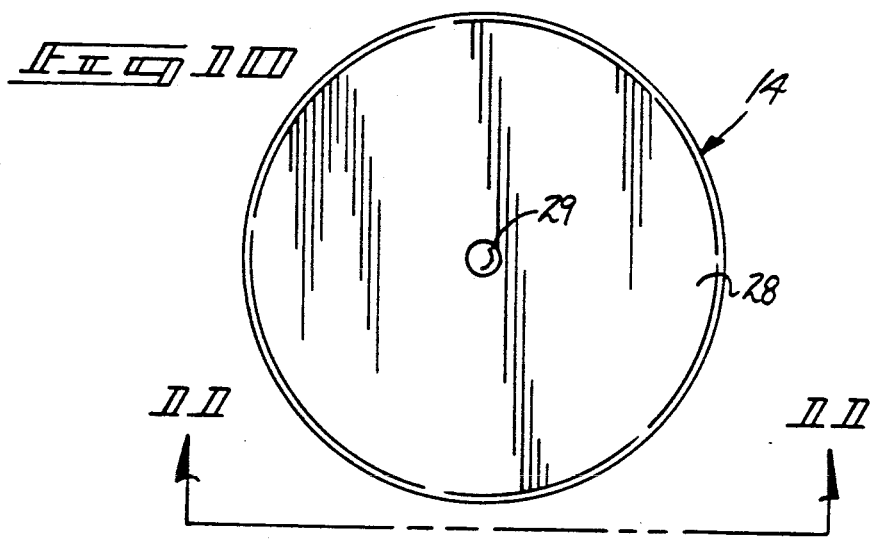
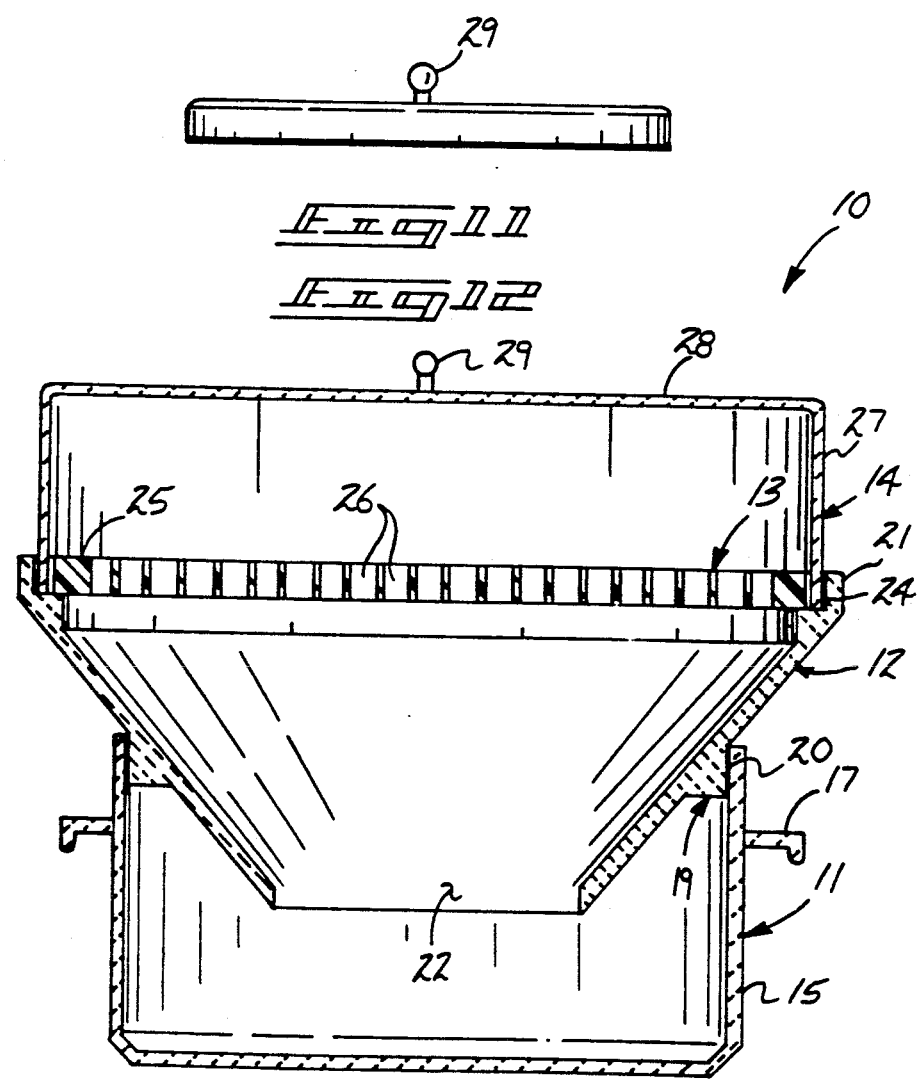

COOKWARE ORGANIZATION

BACKGROUND OF THE INVENTION

1. Field of the Invention

The field of invention relates to cookware apparatus, and more particularly pertains to a new and improved cookware organization wherein the same permits accommodating and directing of grease and removal of the grease during a cooking procedure.

2. Description of the Prior Art

Various cookware has been utilized in the prior art to remove grease relative to food components. The instant invention provides a convenient and readily utilized organization to receive and contain grease relative to food components. Examples of the prior art include U.S. Pat. No. 4,862,791 to Baughey setting forth a frying organization wherein the use of slots direct grease to an underlying chamber.

U.S. Pat. No. 3,994,212 to Wong sets forth a drain pot utilizing parallel ribs contained within the pot to receive and contain grease within the defined troughs between the ribs.

U.S. Pat. No. 3,985,990 to Levinson sets forth an oven baking organization utilizing perforations positioned within an insert overlying a pot structure.

U.S. Pat. No. 3,943,320 to Bowen sets forth a further example of spaced mounting ribs for positioning hot dog-like members thereon permitting drainage of the grease therefrom during cooking.

As such, it may be appreciated that there continues to be a need for a new and improved cookware organization as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of cookware apparatus now present in the prior art, the present invention provides a cookware organization wherein the same utilizes a conical insert mounting a griddle and a lid to provide an enlarged cooking surface relative to an underlying container pot. As such, the general purpose of the present invention, which will be described subsequently in greater detail, is to provide a new and improved cookware organization which has all the advantages of the prior art cookware apparatus and none of the disadvantages.

To attain this, the present invention provides a cookware organization arranged for accommodating and directing grease from various foods into an underlying container pot. The organization is optionally formed of ceramic to permit microwave-type cooking, and includes an underlying container pot, a conical pot insert mounted within the container pot, a griddle insert mounted within the conical insert, and a cover lid positioned within the conical insert in surrounding relationship relative to the griddle insert. The conical insert includes an exterior torroidal positioning ledge for lining the conical insert within the container pot, and wherein the conical insert further includes an interior ledge for positioning the lid and griddle insert thereon.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure to the application. The abstract is neither intended to define the invention of the application, which is measured by the claims, nor is it intended to be limiting as to the scope of the invention in any way.

It is therefore an object of the present invention to provide a new and improved cookware organization which has all the advantages of the prior art cooking apparatus and none of the disadvantages.

It is another object of the present invention to provide a new and improved cookware organization which may be easily and efficiently manufactured and marketed.

It is a further object of the present invention to provide a new and improved cookware organization which is of a durable and reliable construction.

An even further object of the present invention is to provide a new and improved cookware organization which is susceptible of a low cost of manufacture with regard to both materials and labor, and which accordingly is then susceptible of low prices of sale to the consuming public, thereby making such cookware organizations economically available to the buying public.

Still yet another object of the present invention is to provide a new and improved cookware organization which provides in the apparatuses and methods of the prior art some of the advantages thereof, while simultaneously overcoming some of the disadvantages normally associated therewith.

Still another object of the present invention is to provide a new and improved cookware organization wherein the same provides for an enlarged cooking surface relative to an underlying pot permitting directing of grease relative to the cooking surface to the underlying pot.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art cookware apparatus.

FIG. 2 is an isometric illustration of a further example of a prior art cookware apparatus.

FIG. 3 is an orthographic top view of the container pot utilized by the instant invention.

FIG. 4 is an orthographic side view of the container pot utilized by the instant invention.

FIG. 9 is an orthographic view, taken along the lines 9—9 of FIG. 8 in the direction indicated by the arrows.

FIG. 10 is an orthographic top view of the lid utilized by the instant invention.

FIG. 11 is an orthographic side view of the lid structure utilized by the instant invention.

FIG. 12 is an orthographic view taken in cross-section of the cookware organization in an assembled configuration utilized by the instant invention.

DESCRIPTION OF THE PREFERRED EMBODIMENT

Figure 5:
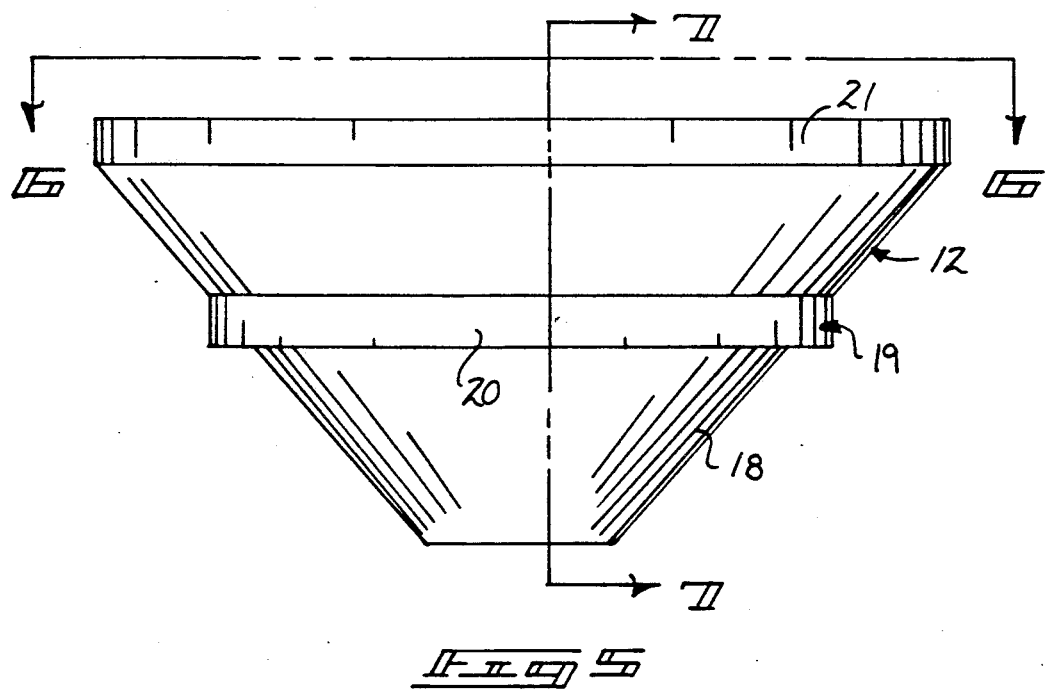
FIG. 5 is an orthographic side view of the conical insert utilized by the instant invention.
Figure 6:
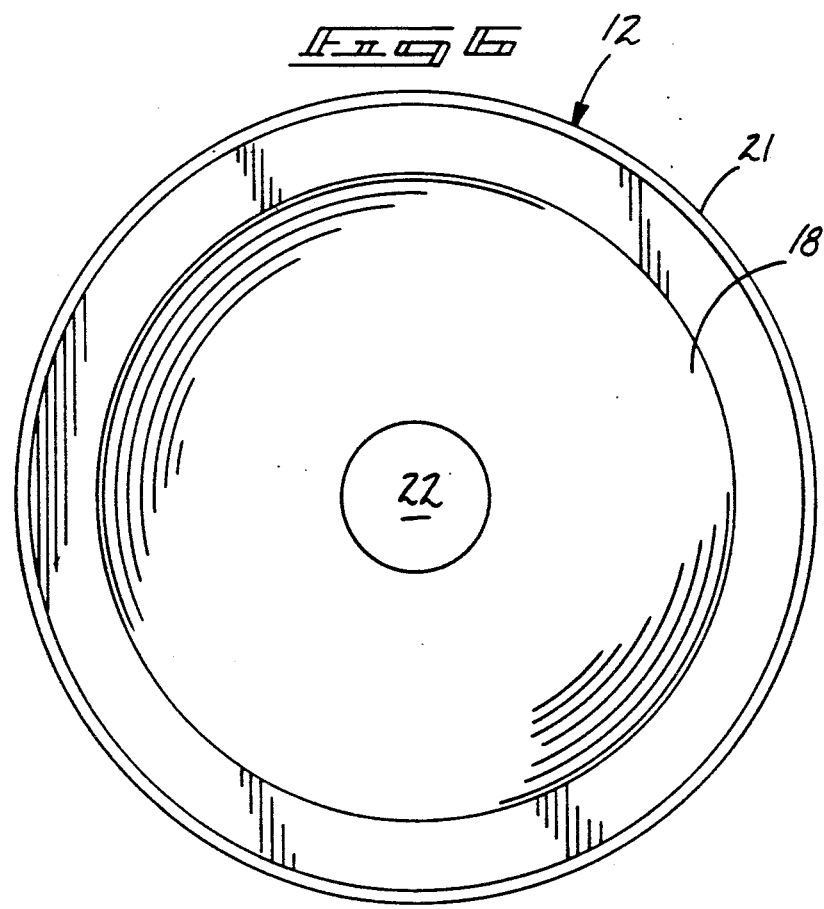
FIG. 6 is an orthographic top view of the conical insert utilized by the instant invention.
Figure 7:
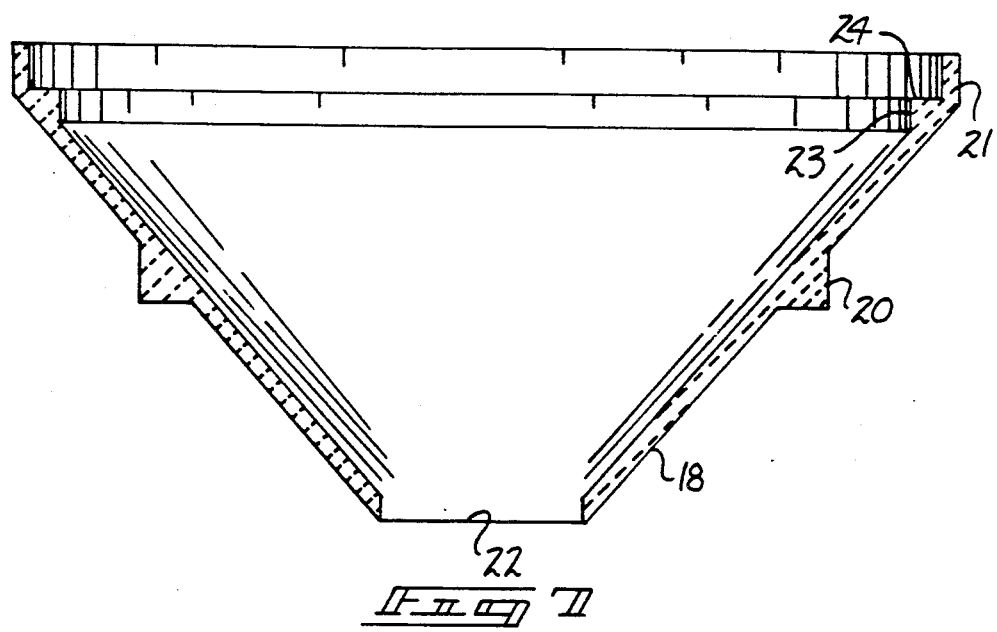
FIG. 7 is a cross-sectional view, taken along the lines 7—7 of FIG. 5 in the direction indicated by the arrows.
Figure 8:
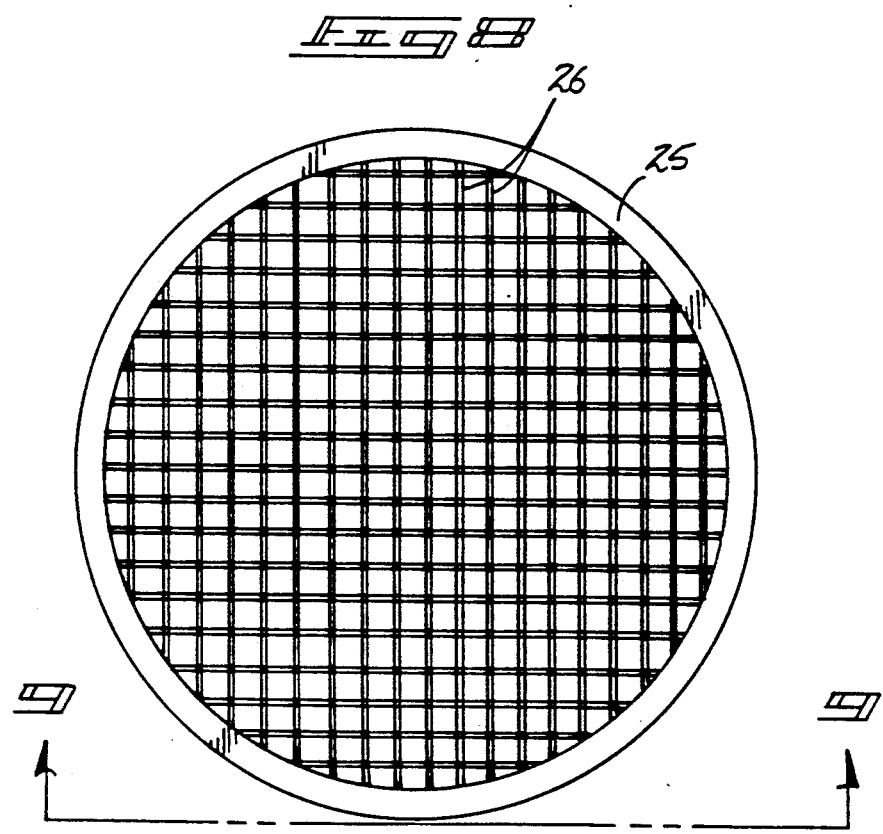
FIG. 8 is an orthographic top view of the griddle insert utilized by the instant invention.

With reference now to the drawings, and in particular to FIGS. 1 to 12 thereof, a new and improved cookware organization embodying the principles and concepts of the present invention and generally designated by the reference numeral 10 will be described.

FIG. 1 illustrates a prior art cookware apparatus 1 for optional use in a microwave, utilizing spaced slats for directing grease therethrough, in a manner as set forth in U.S. Pat. No. 4,862,791. Similarly, FIG. 2 sets forth the organizaiton 2 utilizing parallel ribs for receiving grease therebetween, in a manner as set forth in U.S. Pat. No. 3,994,212 for collection within a central trough.

More specifically, the cookware organization 10 of the instant invention essentially comprises a container pot 11 defined by cylindrical side wall 15 determined by a predetermined first diameter interiorly of the cylindrical side wall The side wall is directed downwardly to a planar floor, with diametrically mounted handles 17 fixedly and orthogonally mounted to the side wall 15 spaced below an upper terminal edge of the side wall 15 that is arranged in a plane orthogonally oriented relative to an axis defined by the cylindrical side wall 15. Receivable within the container pot 11 (see FIG. 12 for example) is a conical insert 12. The conical insert 12 includes a conical side wall 18, with a central opening 22 directed through a lower terminal edge of the conical side wall 18 that is coaxially aligned relative to the conical side wall 18 and the axis defined by the container pot 11 when mounted within the container pot, as illustrated in FIG. 12. An upper terminal end of the conical side wall 18 is defined by a cylindrical upper skirt 21 coaxially aligned relative to a common axis of the container pot 11 and the conical insert 12 when in an assembled configuration. A torroidal exterior ledge 19 is integrally mounted medially to an exterior surface of the conical side wall 18, and includes a cylindrical mounting and alignment surface 20 defined by a predetermined second diameter substantially equal to the first diameter measured interiorly of the cylindrical side wall 15 to align and position the conical insert 12 within the container pot 11 The cylindrical mounting and alignment surface 20 is coaxially aligned relative to the common axis "A", as illustrated in FIG. 12 for example, when the components are in an assembled configuration. A torroidal interior ledge 23 is mounted at the upper terminal end of the side wall 18 at its intersection, with the cylindrical upper skirt 21 mounted interiorly and integrally of the conical side wall 18. The torroidal interior ledge 23 includes a planar horizontal mounting surface 24 that is orthogonally oriented relative to an interior cylindrical surface of the upper skirt 21.

The use of a cylindrical griddle insert 13 is provided, wherein the griddle insert includes a cylindrical frame 25 defined by an exterior frame diameter less than the third diameter defined interiorly of the cylindrical upper skirt 21 to permit positioning of the cylindrical frame 25 upon the planar horizontal mounting surface 24 A matrix of drainage apertures 26 are defined within the cylindrical frame 25 coextensively therewith, and are defined by orthogonally intersecting ribs, as illustrated A cover lid 14 is provided, with the cover lid including a cylindrical side wall 27 defined by a fourth diameter that is less than the third diameter yet greater than the exterior frame diameter to position the lid between the cylindrical frame 25 and the cylindrical upper skirt 21. The cylindrical side wall 27 includes a cover web mounted coextensively to provide an enclosure that overlies the cylindrical side wall 27 and the griddle insert 13, and includes a handle 29 integrally and orthogonally mounted coaxially of the cover web 28 to contain steam and flavoring interiorly within the assembled cookware organization 10, as illustrated in FIG. 12.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A cookware organization comprising, in combination, a container pot, the container pot including a cylindrical side wall, the cylindrical side wall including a predetermined first internal diameter, and a planar floor mounted coextensively between the cylindrical side wall at a lower terminal end of the cylindrical side wall, and the cylindrical side wall defined by a central axis, and the cylindrical side wall including an upper terminal end defined in a horizontal plane, and a conical insert mounted within the cylindrical sidewall and aligned relative to the central axis, and a griddle insert mounted interiorly of the conical insert, and a cover lid moutned overlying the griddle insert within the conical insert, and wherein the conical insert includes a conical side wall, and the conical side wall includes a lower central opening coaxially aligned with the central axis when the conical insert is positioned within the container pot, and the conical side wall including a torroidal exterior ledge fixedly mounted medially of and to an exterior surface of the conical side wall, and the torroidal ledge including a cylindical mounting and alignment surface coaxially aligned relative to the central axis and defined by a predetermined external second diameter substantially equal to the predetermined internal first diameter, and wherein the conical insert further includes a cylindrical upper skirt fixedly mounted to an upper terminal end of the conical side wall and coaxially aligned relative to the central axis, wherein the upper skirt is defined by a predetermined internal third diameter, and a torroidal interior ledge fixedly mounted interiorly of the conical side wall at an upper terminal end of the conical side wall, and wherein the torroidal interior ledge defines a planar horizontal mounting surface orthogonally aligned relative to the cylindrical upper skirt and the cnetral axis, wherein the planar horizontal mounting surface receives the griddle insert thereon, and wherein the griddle insert is defined by a cylindrical main frame defined by a main frame external diameter less than the internal third diameter to position the cylindrical frame on the planar horizontal mounting surface interiorly of the cylindrical upper skirt, and the cylindrical main frame including a plurality of orthogonally intersecting ribs defining a matrix of drainage apertures coextensively directed within the cylindrical frame, and wherein the cover lid includes a cylindrical side wall defined by an external fourth diameter less than the third diameter and greater than the external frame diameter to position the cylindrical side wall between the cylindrical frame and the cylindrical upper skirt mounting the cylindrical side wall on the planar horizontal mounting surface, and the cylindrical side wall further including a cover web coextensively and integrally formed to a cylindrical side wall upper terminal end, with the cover web including a handle coaxially aligned relative to the central axis, wherin the cover lid, griddle insert, conical insert, and container pot are coaxially aligned relative to the central axis when in an assembled orientation relative to one another.

* * * * *